(12) United States Patent
Hartmann et al.

(10) Patent No.: US 8,103,433 B2
(45) Date of Patent: Jan. 24, 2012

(54) METHOD TO DETECT A FAULTY OPERATING CONDITION DURING A CYLINDER CUTOFF OF AN INTERNAL COMBUSTION ENGINE

(75) Inventors: Dirk Hartmann, Stuttgart (DE); Georg Mallebrein, Korntal-Muenchingen (DE); Werner Mezger, Eberstadt (DE); Andreas Roth, Muehlacker-Lomersheim (DE); Henri Barbier, Schwieberdingen (DE); Nikolas Poertner, Stuttgart (DE); Juergen Rappold, Ilsfeld-Auenstein (DE); Ingo Fecht, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 1090 days.

(21) Appl. No.: 11/998,186

(22) Filed: Nov. 29, 2007

(65) Prior Publication Data

US 2008/0312785 A1     Dec. 18, 2008

(30) Foreign Application Priority Data

Nov. 29, 2006   (DE) .......................... 10 2006 056 326

(51) Int. Cl.
*G06F 19/00* (2011.01)
*F02D 41/14* (2006.01)
*F02D 13/06* (2006.01)

(52) U.S. Cl. ................... 701/114; 123/198 F; 123/692; 123/481; 701/104; 701/109

(58) Field of Classification Search ............... 123/198 F, 123/325, 479, 481, 493, 672, 691, 692; 701/101–105, 109, 111, 114, 115; 73/23.32, 73/114.02; 702/182, 183, 185
See application file for complete search history.

(56) References Cited

U.S. PATENT DOCUMENTS

| | | | | |
|---|---|---|---|---|
| 6,901,327 | B2 * | 5/2005 | Bidner et al. | 123/481 |
| 7,195,001 | B1 * | 3/2007 | Pallett | 123/198 F |
| 7,225,801 | B2 * | 6/2007 | Pallett et al. | 123/692 |
| 7,234,455 | B2 * | 6/2007 | Pallett et al. | 123/692 |
| 7,421,836 | B2 * | 9/2008 | Pallett et al. | 123/481 |
| 7,487,035 | B2 * | 2/2009 | Nozawa et al. | 701/114 |
| 2002/0134357 | A1 * | 9/2002 | White et al. | 123/481 |

FOREIGN PATENT DOCUMENTS

JP      2004-100486    4/2004

* cited by examiner

*Primary Examiner* — Willis Wolfe, Jr.
(74) *Attorney, Agent, or Firm* — Merchant & Gould P.C.

(57) ABSTRACT

Method to detect a faulty operating condition during a cylinder cutoff of an internal combustion engine with at least two cylinder banks, wherein the internal combustion engine comprises in each case a separate mechanism to determine the Lambda value of the combustion for each cylinder bank.
When the Lambda values of the cylinder banks change in opposite directions, a faulty cylinder cutoff is suggested.

7 Claims, 2 Drawing Sheets

METHOD TO DETECT A FAULTY OPERATING CONDITION DURING A CYLINDER CUTOFF OF AN INTERNAL COMBUSTION ENGINE

TECHNICAL FIELD

The invention at hand concerns a method to detect a faulty operating condition during a cylinder cutoff of an internal combustion engine with at least two cylinder banks, wherein the internal combustion engine comprises in each case a separate mechanism to determine the Lambda value of the combustion for each cylinder bank.

BACKGROUND

The danger exists with internal combustion engines with a cylinder cutoff for a cylinder to mistakenly be cut off, which actually should be fired, or for a cylinder to mistakenly not be cut off, which should be cut off. A faulty operating condition of this kind is typically detected by means of a misfire detection. A misfire detection of this kind is, for example, described in the Japanese patent JP 2004-100486. When detecting the aforementioned error using the misfire detection, it is, however, not possible to distinguish a cylinder, which has mistakenly not been cut off; or one, which has mistakenly been cut off, from a typical combustion misfire.

The task of the invention at hand is, therefore, to specify a method and a device, which can distinguish an error in the cylinder cutoff from a combustion misfire.

SUMMARY

This problem is solved by a method to detect a faulty operating condition during a cylinder cutoff of an internal combustion engine with at least two cylinder banks, wherein the internal combustion engine comprises in each case a separate mechanism to determine the Lambda value of the combustion for each bank of cylinders, whereby, a faulty cylinder cutoff is suggested when the Lambda values of the cylinder banks change in opposite directions. In the case of an internal combustion engine with intake manifold fuel injection as well as one with direct fuel injection, the cylinder cutoff is usually implemented in such a way that at least the intake or the exhaust valves of the cylinder remain continuously closed so that no air is forced through the cylinder. At the same time the injected fuel quantity is pulled back to zero. The mechanism to determine the Lambda value for each cylinder bank is typically an oxygen probe, which can give off an electric signal, which represents the Lambda value for the respective cylinder. The actual Lambda value is thereby adjusted to a set point value by a closed-loop control device, which, for example, is disposed in the control unit of the internal combustion engine. The control deviation can thus, for example, be acquired in the form of a control factor. When the Lambda values of the cylinder banks change in opposite directions, a corresponding change of the Lambda values for the individual cylinder banks is especially implied, or also a corresponding change of the control factors of the cylinder banks is implied. In so doing, the change of the Lambda values is preferably determined by means of a corrective controller action, whereby each cylinder bank is preferably further assigned a control factor; and the corrective controller action is determined as the change of the control factor with regard to a set point. Therefore, instead of observing the Lambda values of the cylinder banks, the behavior of the Lambda closed-loop control can be observed by way of its corrective controller action.

During a full-engine operation, the cylinder bank of the defective cylinder, which is mistakenly cut off and through which air is passing, is identified if the control factor of the cylinder bank changes in the direction of a decrease in the injected fuel quantity. A leaning of the control factor means in this case that the closed-loop control for the cylinder bank is striving for a lean mixture. During a half-engine operation, the cylinder bank of a defective cylinder, which is mistakenly not cut off, is preferably identified if the control factor of the cylinder bank changes in the direction of an increase in the injected fuel quantity. This means that the closed-loop control is trying to adjust to a richer mixture for the cylinder bank.

The problem mentioned at the beginning of the application is also solved by a device, especially a control unit with wherewithal to detect a faulty operating condition during a cylinder cutoff of an internal combustion engine with at least two cylinder banks, whereby the internal combustion engine comprises in each case a separate mechanism to determine the Lambda value of the combustion for each cylinder bank, whereby when the Lambda values of the cylinder banks change in opposite directions, a faulty cylinder cutoff is suggested. The problem mentioned at the beginning of the application is also solved by a computer program with a program code for the implementation of all of the steps of the method according to the invention if the program is executed on a computer.

BRIEF DESCRIPTION OF THE DRAWINGS

An example of embodiment of the invention at hand is explained below using the accompanying diagrams. The following are shown.

DETAILED DESCRIPTION

Figure 1:
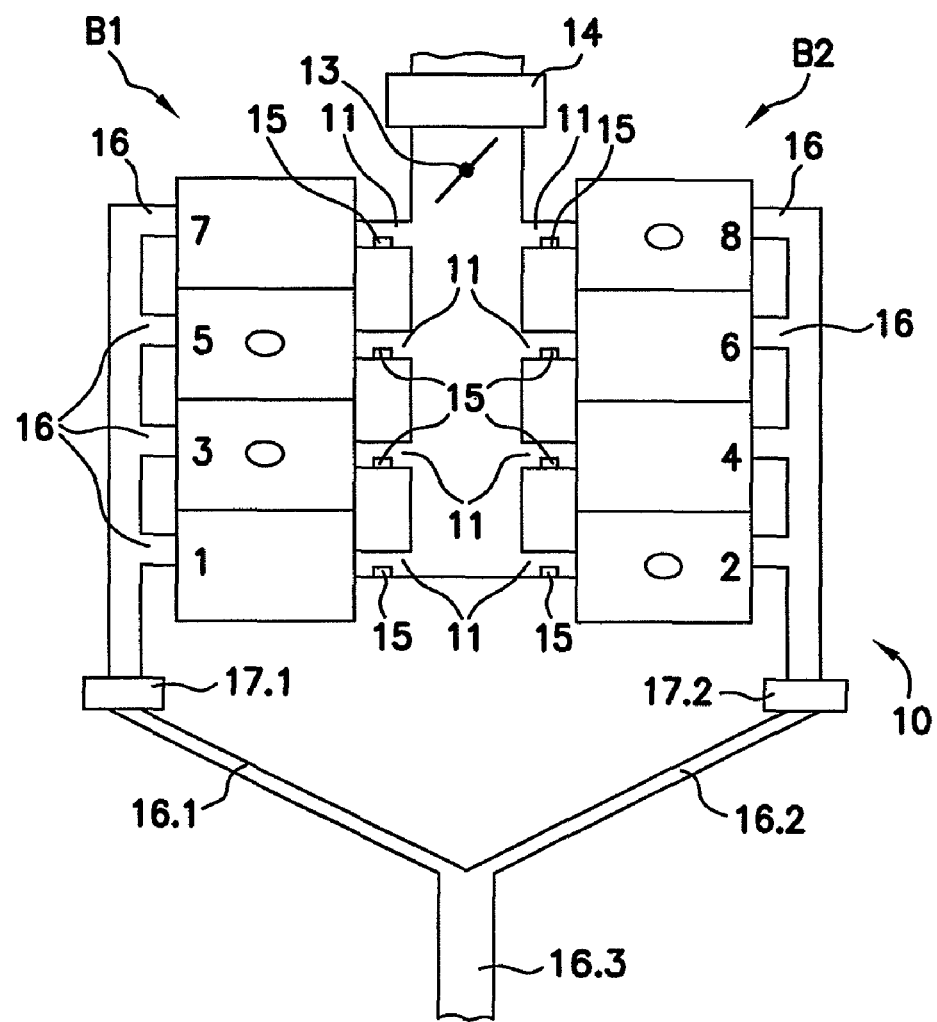
FIG. 1 a drawing of an internal combustion engine with two cylinder banks.

FIG. 1 shows an internal combustion engine 10 with two cylinder banks. These are denoted as B1 and B2 using an 8 cylinder engine. Along these same lines, configurations of, for example, 4 cylinder, 6 cylinder, 10 cylinder, 12 cylinder and the like with a shared fuel gallery are also of course possible. The cylinders are consecutively numbered here with the numbers 1 to 8. An intake port 11 is assigned to each of the cylinders 1 to 8, which open out into a shared intake manifold 12. The intake manifold 12 comprises a throttle valve 13 as well as an air-flow meter 14. An injector nozzle 15 is disposed in each intake port 11. Fuel is injected in the respectively assigned intake port 11 with the aid of the injector nozzle 15. Each of the cylinders 1 to 8 comprises at least one intake valve and at least one exhaust valve, which are not depicted in detail in the drawing of FIG. 1. By opening the respective intake valve of a cylinder, air, respectively a fuel-air mixture by means of the fuel, which has been injected by the respective injection valve, can be drawn into the respective cylinder. By opening the respectively assigned exhaust valve, the combusted fuel-air mixture is discharged into the exhaust manifold 16 during the exhaust stroke. The exhaust manifolds 16 are integrated into an exhaust pipe 16.1 for the bank 1 and 16.2 for the bank 2, which open out into a shared exhaust pipe 16.3. A Lambda probe is disposed in each case in the exhaust pipe 16.1, respectively 16.2. This probe is denoted as 17.1, respectively 17.2. The Lambda value for the respective cylinder bank B1, respectively B2, can be measured with the aid of the Lambda probe 17.1, respectively 17.2. The Lambda probes 17.1 and 17.2 generate an electrical signal for this purpose, which represents the respective Lambda value. Downstream from the Lambda probes 17.1 and 17.2, one or several exhaust gas catalytic converters are disposed. In addition other exhaust gas stream elements, as for example an exhaust-gas turbocharger or the like, can be disposed there.

The Lambda value reflects the proportion of oxygen in the fuel-air mixture relative to the proportion of oxygen required for a stoichiometric combustion. The Lambda value is set by way of a closed-loop control individually by cylinder or as a cylinder bank to a set point value. The control factors for the closed-loop control are, for example, the injected fuel quantity per cylinder, the air volume and, for example, in the case of a variable valve control system the control times of the charge-cycle valves. The degree of filling can thereby be individually adjusted for the cylinders. The degree of filling can also be collectively influenced for all of the cylinders together by an adjustment of the throttle valve.

Beside a full-engine operation of the internal combustion engine, wherein all cylinders proportionally have an effect on the torque produced by the crankshaft of the internal combustion engine, there is a half-engine operation, wherein only a proportion of the cylinders of the internal combustion engine are involved in producing the torque. The remaining cylinders are carried along. This can, for example, result by having the injected fuel quantity reduced to zero for the respective cylinders. In addition it is possible in a variable valve control system for the intake valve or valves, respectively the exhaust valve or valves, of a cylinder, which is being carried along, to be continuously held closed or continuously held open. If the intake valve or valves, respectively exhaust valve(s), are continuously held closed, no forcing of air through the cylinder takes place. If only the injected fuel quantity is set at zero, air is in this case forced through the respective cylinder because it is drawn in during the intake stroke and is discharged into the exhaust gas tract during the exhaust stroke. It is assumed in the following that no conveyance (forcing) of air through a cylinder, which is cut off, takes place and that no fuel is injected in a cylinder being cut off.

In FIG. 1, cylinders being cut off are denoted by an oval outlined in black. A half-engine operation is depicted, wherein the cylinders 2, 3, 5 and 8 are not being fired. Basically two errors can occur when a cylinder is being cut off. On the one hand, a cylinder can mistakenly be active. Thus, the cylinder appears to be actually cut off as no fuel is being injected; however, air is mistakenly being conveyed, respectively forced, through the cylinder. On the other hand, a cylinder can mistakenly be cut off, whereby the intake valves or the exhaust valves of the defective cylinder remain closed in the process although fuel is being injected.

A mistakenly active cylinder causes more air to be drawn in during the half-engine operation than should be the case. In the example of the 8 cylinder engine, in which 4 instead of 8 cylinders are fired in the half-engine operation, 5 cylinders draw in fresh air instead of 4 cylinders as planned when there is a mistakenly active cylinder. All cylinders operating properly are thereby preset with a 25% fuel surplus by way of a map-based pilot control. On the engine bank without a defective valve control system, this fuel surplus is immediately apparent at the Lambda probe. The closed-loop Lambda control will then compensate for this fuel surplus by calling for a leaning of the mixture on this bank. The closed-loop Lambda control adjusts the actual Lambda value of each cylinder bank to a set point Lambda value, whereby the actual Lambda value is linked to the set point Lambda value by means of a control factor. By means of the control factor, the Lambda value can therefore be adjusted in a closed-loop for the individual cylinder or for the individual cylinder bank. In the case of the mixture, which is too rich by 25%, the Lambda value falls to 0.8. On the cylinder bank with the defective valve control system, two cylinders (assuming that in the case of the 8 cylinder engine, two cylinders of a bank are fired and two cylinders are cut off) also initially each receive a 25% fuel surplus by way of the map-based pilot control, while pure air passes through one cylinder. A balance of 3 parts of air and 2.5 parts of fuel result from the aforementioned so that a value of 3/2.5=1.2 arises as the Lambda value. Depending on the degree of mixing, the probe's installed position and its protective pipe as well as the type of Lambda probe (continuous probe, 2. probe and the like), the closed-loop Lambda control will in this instance significantly richen the mixture and further increase the fuel surplus. The defect can be determined and the faulty bank identified by way of the reactions of the control factors occurring in opposite directions on both cylinder banks.

Provided the engine has an injection misfire or an ignition misfire, only one cylinder bank will react correspondingly. Hence, one bank will not become richer and the other leaner. The reaction in opposite directions of both of the (Lambda) control factors is an indication of a mistakenly active cylinder and can thus be distinguished from misfires.

A cylinder, which has been mistakenly cut off, i.e. a cylinder where fuel is being injected but mistakenly no charge cycle is taking place, likewise causes a redistribution of the air mass and a maladjustment of the map-based pilot control of the mixture. The effect is, however, smaller because the pilot control deviation amounts only to (1-1/cylinder number)*100%. In contrast to the case mentioned above, fuel is injected into a cylinder, which has been mistakenly closed, i.e. a cylinder in which mistakenly no charge cycle takes place. This leads to a collection of fuel in front of the intake valves in the case of an engine with intake manifold injection. After a certain amount of time, the injected fuel quantity into the tuned intake runner of the affected cylinder will spread out more and more to the other cylinders of the same cylinder bank. In this way the Lambda control factors change again in opposite directions between the cylinder banks. The cylinder bank operating error free receives ⅞ of the required fuel, which causes an enrichment of the fuel by approximately 14% on account of the Lambda control factor. The cylinder bank with the defective valve control system receives the fuel quantity for four cylinders; however, it receives only an air filling for three cylinders. The outcome of this is an air quantity of 3 proportions and a fuel quantity of 4*7/8=7/2=3.5 proportions of fuel. If the Lambda value were not adjusted, a Lambda of 3/3.5=6/7, approximately 0.867, would thus be in effect. For this reason, the Lambda controller of the defective cylinder bank leans the mixture approximately 14%.

Reactions of both Lambda control factors in opposite directions also result from a cylinder mistakenly being cut off. It must, however, thereby be kept in mind that fuel initially is pre-stored in the tuned intake runner of the defective cylinder. A potential fuel cutoff at this cylinder after detection of the error by means of the misfire detection changes the conditions.

Figure 2:
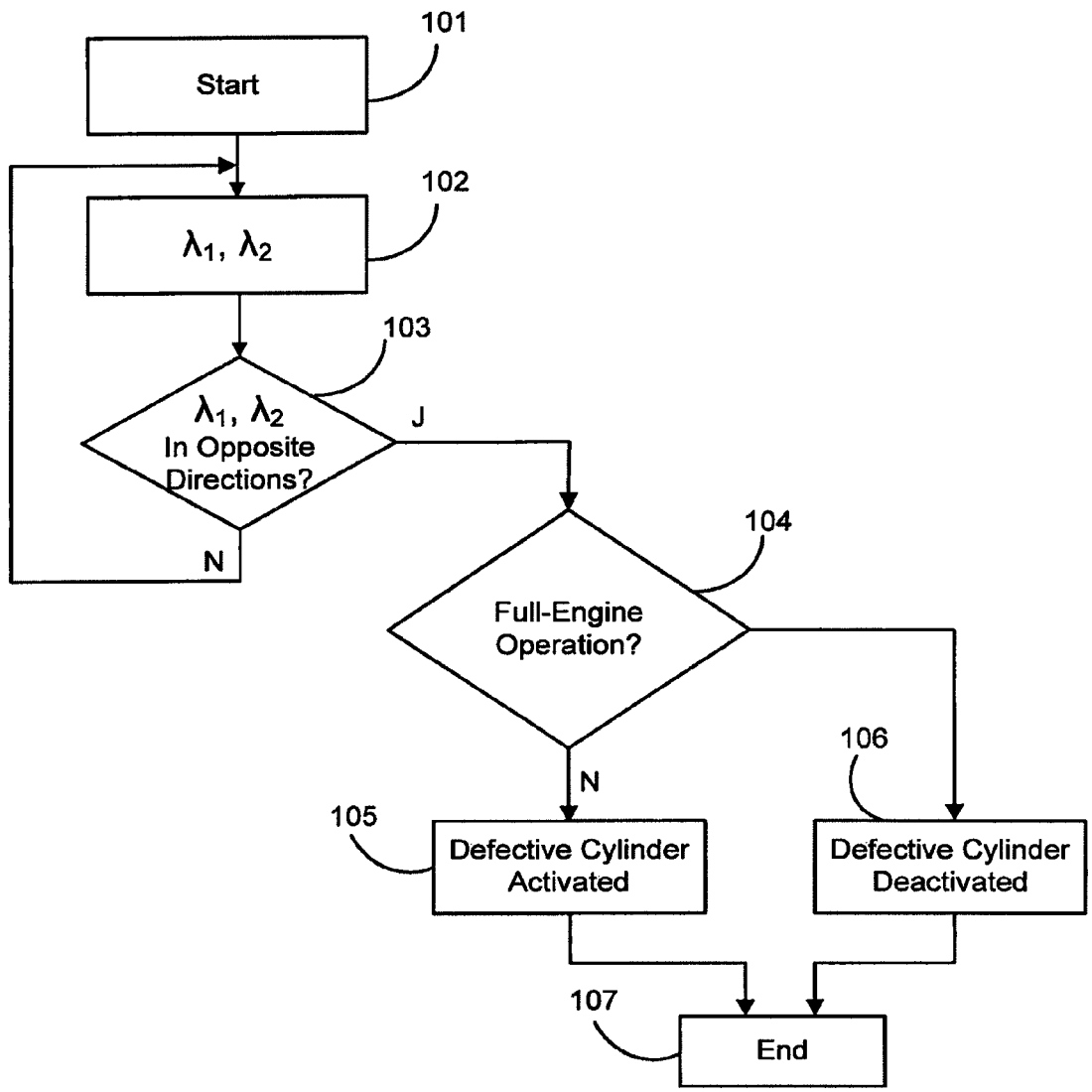
FIG. 2 a flow chart of the method.

FIG. 2 shows a flow chart of the method according to the invention. The method begins with step 101. In step 102 both Lambda control factors and/or the Lambda probe signals of both of the cylinder banks are read in. In step 103 a check is made to determine whether the control factors $RF(\lambda)$ and $RF(\lambda_2)$ for the Lambda values of the cylinder banks are acting in opposite directions, i.e. are changing in opposite directions. If this is the case, the Lambda control factor for one cylinder bank changes to a greater injected fuel quantity and the Lambda control factor of the other cylinder bank changes to a smaller injected fuel quantity. If on the other hand this is not the case, the method returns again to the start and thus cycles continuously. If the query in step 103 of the method is answered with yes, a check is made in step 104 to determine whether the internal combustion engine is situated in the full-engine operation VMB or the half-engine operation HMB.

If the internal combustion engine is situated in the half-engine operation HMB, a check is made in step 106 to determine in which direction which of the two control factors changes. If the control factor $RF(\lambda_1)$ of cylinder bank B1 changes in the direction of an increase in the injected fuel quantity, whereby the control factor $RF(\lambda_2)$ remains constant or changes in the direction of a decrease in the injected fuel quantity (Option 1 in step 106), a cylinder mistakenly not cut off is then present in the first cylinder bank B1 (step 107). If the control factor $RF(\lambda_2)$ of cylinder bank B2 changes in the direction of an increase in the injected fuel quantity, whereby the control factor $RF(\lambda_1)$ of cylinder bank B1 remains constant or changes in the direction of a decrease in the injected fuel quantity (Option 2 in step 106), a cylinder mistakenly not cut off is then present in the second cylinder bank B2 (step 108).

If the check in step 104 results in the internal combustion engine being situated in the full-engine operation VMB (branch VMB in step 104), a check is then made in step 109 to determine in which direction which of the two control factors changes. If the control factor $RF(\lambda_1)$ of cylinder bank B1 changes in the direction of a decrease in the injected fuel quantity, whereby the control factor $RF(\lambda_2)$ of the cylinder bank B2 remains constant or changes in the direction of an increase in the injected fuel quantity (Option 1 in step 109), a cylinder mistakenly cut off is present in the first cylinder bank B 1 (step 110). If the control factor $RF(\lambda_1)$ of the cylinder bank B1 remains constant or changes in the direction of an increase in the injected fuel quantity (Option 2 in step 109), a cylinder mistakenly cut off is present in the second cylinder bank B2 (step 111).

The invention claimed is:

1. A device, especially a control unit, with wherewithal to detect a faulty operating condition during a cylinder cutoff of an internal combustion engine with at least two cylinder banks, wherein the internal combustion engine includes in each case a mechanism to determine a Lambda value of the combustion for each cylinder bank, the device having wherewithal to suggest a faulty cylinder cutoff when the Lambda values of the cylinder banks change in opposite directions.

2. A computer program with a program code to detect a faulty operating condition during a cylinder cutoff of an internal combustion engine with at least two cylinder banks, wherein the internal combustion engine includes in each case a separate mechanism to determine a Lambda value of the combustion for each cylinder bank, the computer program comprising instructions to suggest a faulty cylinder cutoff when the Lambda values of the cylinder banks change in opposite directions.

3. A method of detecting a faulty operating condition during a cylinder cutoff of an internal combustion engine with at least two cylinder banks, wherein the internal combustion engine includes in each case a separate mechanism to determine a Lambda value of the combustion for each cylinder bank, the method comprising suggesting a faulty cylinder cutoff when the Lambda values of the cylinder banks change in opposite directions.

4. A method according to claim 1, further comprising determining the change of the Lambda values by means of a corrective controller action.

5. A method according to claim 4, further comprising assigning each cylinder bank a control factor, and determining the corrective controller action as a temporal change of the control factor.

6. A method according to claim 5, further comprising identifying the cylinder bank of the defective cylinder during a full-engine operation if the control factor of the cylinder bank changes in the direction of a decrease in the injected fuel quantity.

7. A method according to claim 5, further comprising identifying the cylinder bank of the defective cylinder during a half-engine operation if the control factor of the cylinder bank changes in the direction of an increase in the injected fuel quantity.

* * * * *